A. F. KELLY.
SPLIT SPRING WHEEL FELLY RIM.
APPLICATION FILED MAR 29, 1920.
1,412,352.
Patented Apr. 11, 1922.
2 SHEETS—SHEET 2.
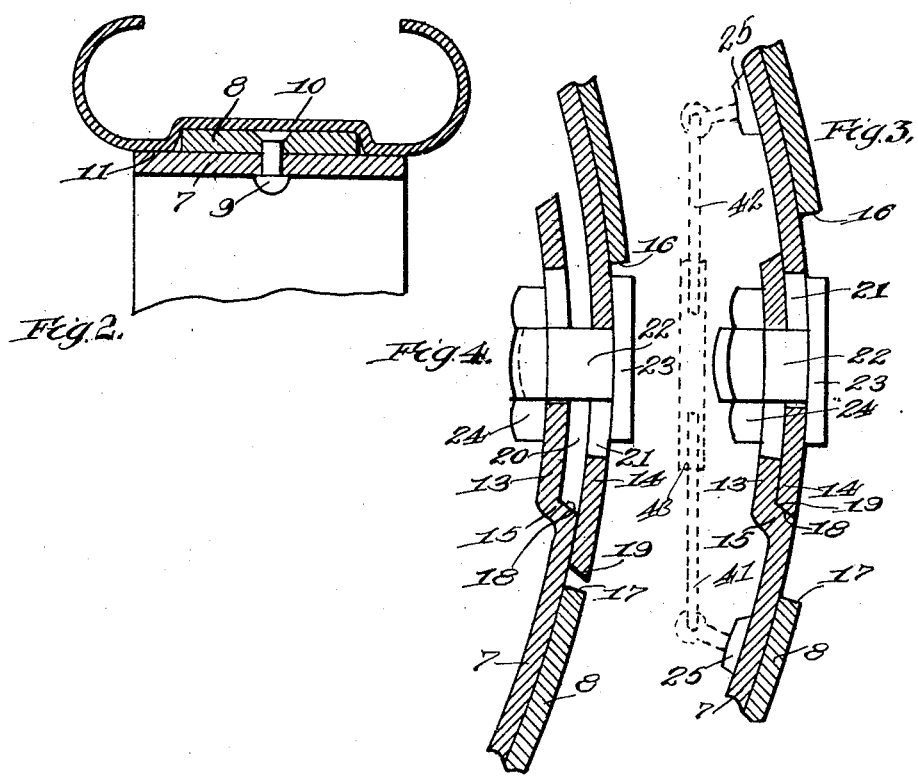
INVENTOR
Adelbert F. Kelly
BY
Carl M. Crawford
ATTORNEY

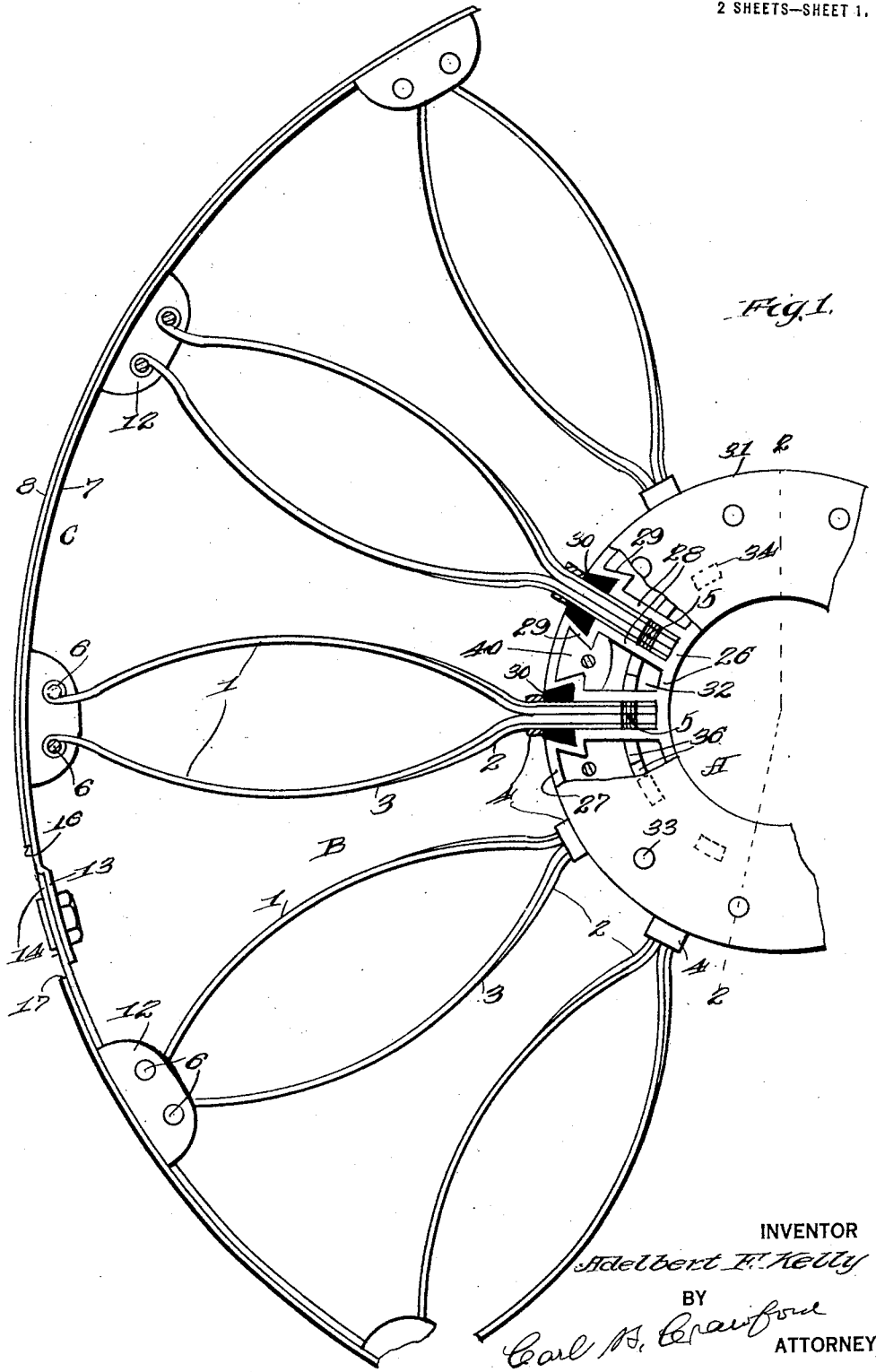

UNITED STATES PATENT OFFICE.

ADELBERT F. KELLY, OF SPOKANE, WASHINGTON.

SPLIT SPRING-WHEEL FELLY RIM.

1,412,352.  Specification of Letters Patent.  Patented Apr. 11, 1922.

Application filed March 29, 1920. Serial No. 369,765.

*To all whom it may concern:*

Be it known that I, ADELBERT F. KELLY, a citizen of the United States, residing at Spokane, in the county of Spokane and State of Washington, have invented new and useful Improvements in Split Spring-Wheel Felly Rims, of which the following is a specification.

This invention relates to improvements in spring wheels and has to do more particularly with a novel form of rim.

One of the objects of this invention is to provide a novel form of rim which forms a permanent part of the wheel, and which is split to afford means for contraction or expansion of the rim to remove or position thereon a tire rim.

It is a feature of my invention to provide this rim with a split joint of lapped formation and to provide the lapping terminals with slots of a sufficient degree of elongation to permit the use of a single bolt for holding the lapped terminals, while expanded or contracted, without necessitating removal of the bolt but merely requiring the loosening of the nut thereof.

It is a further feature of this invention to provide the lapped terminals with coacting shoulders arranged for abutting engagement for the purpose of holding the wheel rim to an expanded position of normal diameter and thereby retaining a tire rim thereon and taking a portion of the strain from the bolt.

It is a further feature to provide shoulders of this character at a slight tangent or angle to the radial so that when they are brought into coacting relation, in their first stage, they will impart a gradually increasing expansive thrust to the wheel rim so that when the lapped joints are finally brought into abutting relation, a maximum expansion of the rim to normal diameter will have been effected.

Other features and objects of the invention will be more fully described in connection with the accompanying drawings and will be more particularly pointed out in and by the appended claims.

In the drawings:—

Figure 1, is a view in side elevation, with parts broken away, showing the most improved embodiment of my invention.

Figure 2, is a sectional view of a portion of the wheel rim showing the manner in which a tire rim is mounted thereon.

Figure 3, is an enlarged sectional view of the lap joint showing the same closed and with the rim in a maximum expanded adjustment.

Figure 4 is a similar view showing the rim contracted.

Like characters of reference designate similar parts throughout the different figures of the drawings.

In my improved construction, A designates the hub, B the spokes and C the rim, the latter forming a permanent part of the wheel structure. As the present invention does not specifically reside in the spokes, the same will only be sufficiently described to permit of an understanding of the balance of the structure. As shown, said spokes consist of bowed spring leaves 1, converging toward the hub and having parallel portions disposed in hub sockets.

Reference will next be made to the novel form of wheel rim.

As illustrated, this novel rim is composed of a spoke attaching section 7 and the reinforcing section 8, the latter being rigidly secured to the former, as by means of rivets 9, and also functioning as an annular projection to hold a tire rim 10 in position on the wheel rim, as will be seen by reference to Figure 6. In this figure, it will be noted that the reinforcing section 8 is somewhat narrower than the rim section 7 thereby providing annular shoulders for supporting the outer sides of the tire rim. Portions of the inner section 7 are bent downwardly on opposite sides thereof as indicated at 12, through which the rivets 6 extend, for holding the outer ends of the springs. as will be clearly seen by reference to Figure 1.

Reference will next be made to the split feature of the wheel rim whereby the latter may be contracted or expanded to take off or put on the tire rim 10.

Figures 3 and 4 more clearly show this feature from which it will be seen that the terminals 13 and 14 are in lap joint relation. Terminal 13 is offset radially inwardly at 15, so as to provide for a flush periphery, the reinforcing section 8 terminating at 16 and 17, abreast of the lap joint. The lapping terminals are provided with shoulders adapted to be disposed in abutting relation to hold the rim at the maximum expansion diameter, and in the present construction, one shoulder 18 is formed at the offset 15, and the remaining shoulder 19 is formed at the terminal end of the coacting or outer lap 14. Thus while the terminals are in overlapping abutting relation they will at the same time have shoulder engagement for holding the rim at a maximum diameter. Instead of having the shoulders radial to the wheel, the same are at a slight angle to the radial, in such a manner that when they are brought into coaction they will impart a gradually increasing expansive thrust to the wheel rim to most effectively tighten the same into rigid engagement with the tire rim, and the incline of the shoulders 18 and 19 is at such angle to the radial as to perform this function. The terminal 13 has an elongated slot 20, and the terminal 14 has an elongated slot 21. A bolt 22 extends through these slots and has a narrow head 23 on the periphery of the rim and a nut 24 on the inside thereof. The bolt 22 is of sufficient length so that the nut 24 need not be entirely removed when the rim is contracted from the position shown in Figure 3, to the position shown in Figure 4. Furthermore, the slots 20 and 21 are sufficiently elongated to always remain in registry and permit of the maximum contraction and expansion of the rim without taking out the bolt 22.

Suitable means, which will be later described, and which will not be herein claimed, is adapted to be applied to lugs 25 for the purpose of facilitating expansion and contraction of the rim. However, it is desired to emphasize the point that after the rim is expanded, to start engagement of the radially outer edge of shoulder 18 with the radially inner edge of shoulder 19, then, the nut 24 will be brought into play and by its clamping action on the lapping joints 13 and 14, and by reason of the angle of the shoulders 18 and 19, a final tightening action will be imparted to the rim in a manner to expand the latter not only to its maximum diameter but into effective engagement with the tire rim.

Brief reference will next be made to a common form of means for expanding and contracting the wheel rim which is shown in dotted lines in Figure 3, and which may consist of oppositely threaded rods 41 and 42, removably anchored to lugs 25, and having a nut sleeve which may be turned in opposite directions to provide or impart the major extent of contraction and expansion.

It is believed that my invention will be fully understood from the foregoing description, and while I have herein shown and described one specific form thereof, I do not wish to be limited thereto except for such limitations as the claims may import.

I claim:—

1. In a spring wheel, a rim forming a permanent part thereof and said rim being split with the terminals in lap joint relation when in use with the tire, the inner lapping terminal being offset radially inwardly and having a rim expanding shoulder at the offset and at an angle to the radial, the outer lapping terminal having an end rim expanding shoulder for coaction with said first named expanding shoulder to expand the wheel rim to normal when said lapped joints are forced into abutting relation, said lap terminals being slotted, and a radially disposed bolt extending through said slots and having a head and nut engaging said terminals for forcing and holding said lap joints in abutting relation.

2. In a spring wheel, a rim forming a permanent part thereof and said rim being split with the terminals in lap joint relation, the inner lapping terminal being offset radially inwardly and having a rim expanding shoulder at the offset and at an angle to the radial, the outer lapping terminal having an end rim expanding shoulder for coaction with said first named expanding shoulder to expand the wheel rim to normal when said lapped joints are forced into abutting relation, said lap terminals being slotted, a radially disposed bolt extending through said slots and having a head and nut engaging said terminals for forcing and holding said lap joints in abutting relation, and a tire rim holding and reinforcing strip rigidly secured to the periphery of said wheel rim and having its terminals in spaced relation abreast of said lap joints of said wheel rim.

3. In a spring wheel, a rim forming a permanent part thereof and said rim being split with the terminals thereof in normal lap joint relation, one of said terminals being offset and having a rim expanding shoulder at its offset and at a tangent to the radial, the other lapping terminal having a corresponding rim expanding shoulder for coaction with the first named expanding shoulder to expand the wheel rim to normal when said lap joints are forced into abutting relation, and means exercising radial stress for forcing and holding said lap joints in abutting relation.

In testimony that I claim the foregoing as my own, I hereby affix my signature.

ADELBERT F. KELLY.